United States Patent [19]

Consolazio et al.

[11] 4,374,063

[45] Feb. 15, 1983

[54] PROCESS FOR THE PREPARATION AND PURIFICATION OF GELATIN AND PYROGEN-FREE GELATIN SO PREPARED

[75] Inventors: George A. Consolazio, Burlington; Gury Pano, Jamaica Plain, both of Mass.

[73] Assignee: General Foods Corporation, White Plains, N.Y.

[21] Appl. No.: 306,274

[22] Filed: Sep. 28, 1981

[51] Int. Cl.³ .............................................. C09H 3/02
[52] U.S. Cl. .................................. 260/118; 260/123.7
[58] Field of Search .............................. 260/118, 123.7

[56] References Cited

U.S. PATENT DOCUMENTS 3,046,210  7/1962  Lowry ................................. 260/118
4,204,992  5/1980  Cruz, Jr. ........................... 260/123.7

OTHER PUBLICATIONS

Remington's Pharmaceutical Sciences, 14th Ed., 1970, pp. 1524–1525.
Kirk-Othmer, Encyclopedia of Chemical Technology, vol. 10, 1967, pp. 503–506.

*Primary Examiner*—Howard E. Schain
*Attorney, Agent, or Firm*—Thomas V. Sullivan

[57] ABSTRACT

A process of preparing an essentially pyrogen-free gelatin solution from cattle hides and/or tanner's stock is described. The essentially pyrogen-free gelatin solution and the use of the pyrogen-free gelatin solution for various pharmaceutical, surgical and medical uses are also described.

5 Claims, No Drawings

PROCESS FOR THE PREPARATION AND PURIFICATION OF GELATIN AND PYROGEN-FREE GELATIN SO PREPARED

DESCRIPTION

Technical Field

This invention relates to a process for the preparation of gelatin. More particularly, it relates to a process for the preparation and purification of gelatin. Still more particularly, it relates to a process for the preparation and purification of gelatin so as to obtain an essentially pyrogen-free gelatin.

The invention also relates to the essentially pyrogen-free gelatin so prepared.

Gelatin is a product obtained by the partial hydrolysis of collagen derived from the skin, white connective tissue, and bones of animals. Gelatin derived from an acid-treated precursor is known as Type A and gelatin derived from an alkali-treated precursor is known as Type B.

Gelatin is widely used in the food, pharmaceutical, photographic film and other industries and the standards and specifications for its purity, freedom from microbial contamination and sterility vary to a certain extent depending upon the end use to which the gelatin is put. Precautions are taken in accordance with good manufacturing practice to prevent contamination of gelatin with bacteria, yeast and molds during the manufacture of gelatin so that the final gelatin product is substantially free from microbial contamination and is essentially pure. Despite such precautions, however, certain pharmaceutical uses require a gelatin that is essentially free of endotoxins, antigens and pyrogens.

Since the source materials for gelatin are animal or animal-derived and manufacturing processes for gelatin are difficult to carry out under totally aseptic conditions it is apparent that the preparation and purification of gelatin so as to have it essentially endotoxin-, antigen-, and pyrogen-free are significant problems. While certain measures have been and may be taken to reduce the total microbial count an absolutely sterile gelatin is extremely difficult to manufacture. Also although various purification steps may be resorted to as to lower the total plate counts of bacteria, yeasts and molds the problem of pyrogens in gelatins for certain pharmaceutical uses is a difficult one.

Pyrogens, bacterial endotoxins, are lipo-polysaccharides and are derived from the outer cell membrane of gram-negative bacteria. They cause prompt temperature rises in animals when injected in microgram doses. Since they are very stable materials, even in boiling water, they are difficult to destroy and also difficult to remove from solution. Manufacturers of specialty pharmaceutical products such as sponges, films and the like have attempted to produce pyrogen-free gelatin with little success. Yet such products are required to be sterile because of implantation in or contact with the human body.

Thus, gelatin in the form of a sterile, absorbable, water-insoluble sponge is available and is used as a hemostatic and coagulant used to control bleeding. It is moistened with sterile sodium chloride solution or thrombin solution and may then be left in place following the closure of a surgical incision. It is absorbed in from four to six weeks. Also, a sterile, water-insoluble, gelatin film obtained from a specially prepared gelatin-formaldehyde solution is available and is used both as a mechanical protective and as a temporary supportive structure and replacement matrix in surgical repair of defects in membranes, such as the dura mater and the pleura. When emplaced between damaged or operated structures, it prevents adhesions. When moistened, the film becomes pliable and plastic, so that it can be fitted to the appropriate surface. Absorption requires one to six months.

Gelatin hydrolysates have been prepared commercially for intravenous applications such as blood plasma extenders. These products may be prepared by hydrolyzing gelatin and processing the resulting material through sterile equipment. The final step involves filtration. However, processing difficulties are apparently encountered with conventional commercial gelatin probably due to its higher molecular weight and the larger chains present which may physically bind pyrogen materials.

Various prior art techniques have been described for purifying and treating gelatins or solutions. However, such prior art methods have certain undesirable characteristics such as long processing times, use of expensive materials for treatment, special filtration equipment, employment of high temperatures for substantial periods of time, etc. A further disadvantage of certain prior methods is seen in their resulting in degradation of gelatin because of the processing techniques employed. Degradation is evidenced by a lowering of the Bloom and/or the viscosity of the gelatin, which characteristics are generally desired to be kept at a high level for the special pharmaceutical, medical and surgical applications in which the gelatin may be employed.

It is expected that Federal Government regulatory agencies may require that gelatin products used in special pharmaceutical/medical/surgical applications such as sponges, films and the like must be pyrogen-free. There is thus a need for pyrogen-free gelatin and, as far as applicants are aware, there is no commercial product available.

DISCLOSURE OF INVENTION

In accordance with the present invention, it has now been unexpectedly discovered that the starting raw material is critical in the process of producing pyrogen-free gelatin. Since pyrogens have a bacterial origin, the presence of bacteria during any stage of the gelatin manufacturing process will result in the formation of pyrogens. Therefore, the raw material requires special processing and the subsequent steps must be carried out under sterile and pyrogen-free conditions.

The process of preparing an essentially pyrogen-free gelatin involves the following steps:

(a) cattle hides and/or tanner's stock are conditioned (conditioning is the process whereby native collagen is rendered soluble by hot water extraction) with lime or sodium hydroxide solution.

(b) the raw material is then washed a number of times with pyrogen-free water.

(c) the pH is adjusted to 3.7 to 4.7, preferably to 4.0 to 4.5, with acid and the stock is extracted to produce gelatin.

(d) the gelatin extract is then filtered through a low porosity pulp pad and collected in sterile, pyrogen-free containers.

All process equipment is treated with 3% caustic solution and thoroughly washed with pyrogen-free water. The gelatin extract which is recovered may be subsequently processed further under aseptic conditions. Thus, it may be spray dried or evaporated, chilled, dried and comminuted to produce a dry pyrogen-free gelatin product. The pyrogen-free gelatin so produced has a standard Bloom of 200 to 275 and a standard viscosity of 30 to 45 millipoises. (Cf. *Standard Methods for the Sampling and Testing of Gelatins*, Gelatin Manufacturers Institute of America, Inc., New York, N.Y.)

The gelatin which may be prepared and treated according to the process of this invention may be one obtained by either the so-called acid process or alkaline or lime process, that is, either type A or B gelatin. Especially advantageous results appear to be evidenced by employing gelatin which has been obtained from alkaline or lime processed cattle or calf hides, typically tanners' stock or ossein. It will be apparent that depending upon the source materials as well as the processing conditions used to extract the gelatin, greater or lesser amounts of contaminants will be found therein. Thus, for example, gelatin which has been extracted and recovered from pig skins treated by the so-called acid process will generally contain substantially more endotoxins, antigens, and pyrogens than a gelatin which has been recovered from lime splits or ossein.

Pyrogen-free water for processing is obtained by any one of a number of methods. Typically, removal of endotoxins from distilled water may be achieved by filtration through commercially available low porosity cellulose filters as Cuno Zeta plus filter cartridges and Pall Ultipor membrane filter cartridges.

Low porosity filters of other types such as Ertel low porosity filter pads may be employed in the process. In general, the low porosity filters, filter cartridges and filter pads for use in the process have average filter capacities, for water, ranging from about 25 gal./ft.$^2$/hr. to about 120 gal./ft.$^2$/hr.

Best Mode for Carrying Out the Invention

The following example is for the purpose of illustrating and explaining the best mode for carrying out the invention, but is not meant to be limiting in any regard. Unless otherwise indicated, all parts and percentages are by weight.

EXAMPLE

The equipment (tanks, pumps, lines, etc.) was washed with (160° F.) 3% sodium hydroxide solution and the water employed for washing equipment and stock was pyrogen-free water. The raw material employed was good quality dry splits (24 pounds) conditioned for 7 days in 1.5% caustic solution, followed by a 2-day soak in 3% caustic solution (40 gallons). The stock was then washed with pyrogen-free water at 55° to 65° F. via fill and drain (4 times). The stock/water was then acidulated with concentrated hydrochloric acid. Hydrogen peroxide was added to the solution to give a level of 2,000 ppm based on the weight of wet stock. After soaking to an equilibrium pH of 3.7 to 4.2 for a total acidulation time of 14 hours, the acid solution was drained and the stock was covered with pyrogen-free water and allowed to soak for 15 hours to remove excess acid. The solution was also drained and the stock was then covered with 8 gallons of 120° F. pyrogen-free water. The temperature was then raised to 140° to 150° F., and the stock was extracted for 8 hours at pH 3.8 to 4.7 to a concentration of 6% gelatin solids.

The solution was filtered through a plate and frame filter press equipped with low porosity Ertel filter pads having a filter capacity, for water, of about 120 gal./ft.$^2$/hr. The press was thoroughly washed initially and then treated with 3% caustic solution and then rinsed with pyrogen-free water. The press was then equipped with the pads and the entire dressed filter was steamed and finally washed with 140° F. pyrogen-free water.

The solution was collected in sterile, plastic containers which had been rinsed with pyrogen-free water and stored at 10° F. The gelatin so produced had a Bloom of 200 to 275 and viscosity of 30 to 45 millipoises.

When tested for pyrogens by the standard method of United States Pharmacopeia (cf., USP Pyrogen Test, page 888, USP XX), the gelatin solution was found to be essentially pyrogen-free.

When tested for sterility by the standard method of Microbiological Tests (cf., USP, Microbial Test Methods, page 874, USP XX), the gelatin solution was found to be sterile.

The gelatin product prepared in accordance with the process of this invention is thus characterized by its being pyrogen-free and sterile.

While the present invention has been described in conjunction with various preferred embodiments, it is to be understood that it is not to be merely and so restricted thereto. It will be apparent that numerous modifications and advantages of the invention will be obvious and, therefore, no limitations should be set therein except insofar as they appear in the appended claims.

We claim:

1. A process of preparing an essentially pyrogen-free gelatin solution which comprises:
    (a) conditioning cattle hides and/or tanner's stock in a caustic solution in a pyrogen-free vessel;
    (b) water washing the hides and/or stock with pyrogen-free water;
    (c) treating the hides and/or stock with an acid solution;
    (d) extracting gelatin at a pH of from 3.7 to 4.7 from the hides and/or stock;
    (e) filtering the extract through a low porosity filter; and
    (f) recovering an essentially pyrogen-free gelatin solution.

2. A process as in claim 1 in which the caustic solution of (a) is sodium hydroxide and the acid solution of (c) is hydrochloric acid.

3. A process as in claim 2 in which the pH in (d) is from 4.0 to 4.5 and the time for extracting the gelatin is from four to eight hours.

4. A process as in claim 3 in which the low porosity filter has a filter capacity, for water, of about 120 gal./ft$^2$/hr.

5. An essentially pyrogen-free gelatin solution prepared by the process of claim 1.

* * * * *